(12) United States Patent
Fukatsu

(10) Patent No.: US 10,652,203 B2
(45) Date of Patent: May 12, 2020

(54) NETWORK SYSTEM, COMMUNICATION CONTROL DEVICE AND ADDRESS SETTING METHOD

(71) Applicant: Mitsubishi Electric Corporation, Tokyo (JP)

(72) Inventor: Noriyasu Fukatsu, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 0 days.

(21) Appl. No.: 16/328,356

(22) PCT Filed: Oct. 4, 2016

(86) PCT No.: PCT/JP2016/079481
§ 371 (c)(1),
(2) Date: Feb. 26, 2019

(87) PCT Pub. No.: WO2018/066061
PCT Pub. Date: Apr. 12, 2018

(65) Prior Publication Data
US 2020/0053046 A1    Feb. 13, 2020

(51) Int. Cl.
*H04L 29/06*    (2006.01)
*H04L 29/12*    (2006.01)

(52) U.S. Cl.
CPC ........ *H04L 61/2514* (2013.01); *H04L 61/103* (2013.01); *H04L 61/2038* (2013.01)

(58) Field of Classification Search
CPC ............. H04L 12/4641; H04L 63/0272; H04L 12/4633; H04L 69/08; H04L 29/12009;
(Continued)

(56) References Cited

U.S. PATENT DOCUMENTS 7,558,880 B2 *  7/2009  Yoshimoto ........ H04L 29/12066
                                                    709/218
7,650,427 B1 *  1/2010  Liu ..................... G06Q 20/401
                                                    370/237
(Continued)

FOREIGN PATENT DOCUMENTS

JP    H08-221334 A    8/1996
JP    H09-073304 A    3/1997
(Continued)

OTHER PUBLICATIONS

International Search Report of the International Searching Authority dated Nov. 15, 2016 for the corresponding international application No. PCT/JP2016/079481 (and English translation).

*Primary Examiner* — Sai Aung
(74) *Attorney, Agent, or Firm* — Posz Law Group, PLC

(57) ABSTRACT

A network system includes control devices, network interface units connected to the respective control devices, and operator interface stations each of which stores an address conversion table. Each of the network interface units includes a network-address setting unit to set a virtual identification information when the control device connected thereto is being set for an active system and to set proper identification information when the control device connected thereto is being set for a standby system, and includes an address-conversion-table update instruction unit to request the operator interface stations to update their respective address conversion tables on the basis of the identification information that has been set.

9 Claims, 15 Drawing Sheets

(58) Field of Classification Search
CPC ............. H04L 61/2007; H04L 61/2514; H04L 61/6022; H04L 69/16; H04L 12/5601; H04L 29/12066; H04L 29/12367; H04L 29/12839
See application file for complete search history.

(56) References Cited

U.S. PATENT DOCUMENTS 8,289,862 B2 * 10/2012 Xia ................... H04L 29/12301
370/252
2003/0225900 A1 * 12/2003 Morishige ......... H04L 29/12358
709/230

FOREIGN PATENT DOCUMENTS

| JP | H10-094073 A | 4/1998 |
| JP | 2005-136690 A | 5/2005 |
| JP | 2007-334484 A | 12/2007 |

* cited by examiner

NETWORK SYSTEM, COMMUNICATION CONTROL DEVICE AND ADDRESS SETTING METHOD

CROSS REFERENCE TO RELATED APPLICATIONS

This application is a U.S. national stage application of International Application No. PCT/JP2016/079481, filed on Oct. 4, 2016, the contents of which are incorporated herein by reference.

TECHNICAL FIELD

The present invention relates to a network system in which communication addresses are set to multiplexed control devices, a communication control device in the network system, and an address setting method for the network system.

BACKGROUND

A programmable logic controller (also referred to as PLC) used as a control device for controlling an apparatus such as industrial machinery is sometimes multiplexed in order to ensure robustness against a failure. In a system with the control device being multiplexed, when the control device in the active system fails and then the control device in the active system is switched to a multiplexed control device, an apparatus having communicated with the control device communicates with the multiplexed control device.

In Patent Document 1, a technique is disclosed in which two programmable controllers, i.e. duplexed program controllers, each have the same transmission address set therein and an optical switching means switches the programmable controller of the active system. Thus, by using the technique shown in Patent Document 1, even when the programmable controller in the active system is switched, slave-station-side devices can continue their communication using the same addresses, regardless of the switching.

Patent Document

Patent Document 1: Japanese Unexamined Patent Application Publication No. H9-73304

However, in the technique described in Patent Document 1, a single optical switching means is provided, so that a failure of the optical switching means will prevent the system from continuing its operation. In other words, the technique according to Patent Document 1 has a problem that the technique does not provide, for the entire network system, enough robustness against a failure.

SUMMARY

The present invention is made to cope with the above-mentioned problem and to obtain a network system with multiplexed control devices, which can ensure robustness of the entire network system.

In order to solve the problem described above and achieve the purpose, a network system according to the present invention includes: multiple control devices; multiple communication control devices connected to the respective multiple control devices; and at least one monitoring device to monitor the multiple control devices, wherein the at least one monitoring device is provided with a storage unit to store an address conversion table including network addresses of the multiple communication control devices. Each of the communication control devices comprises: an address setting unit to set, when the control device connected thereto is set for an active system, virtual identification information for its own identification information, and to set, when the control device connected thereto is set for a standby system, its proper identification information for its own identification information; and an address update unit to request the at least one monitoring device to update the address conversion table on the basis of the identification information set by the address setting unit.

The network system according to the present invention has an effect that in a network system with control devices being multiplexed, robustness of its entire network system can be ensured.

DETAILED DESCRIPTION

Hereinafter, explanation will be made on the basis of figures in detail, about a network system, a communication control device, and an address setting method according to the present embodiment of the present invention. In addition, the present invention will not be limited to the present embodiment.

Embodiment

Figure 1:
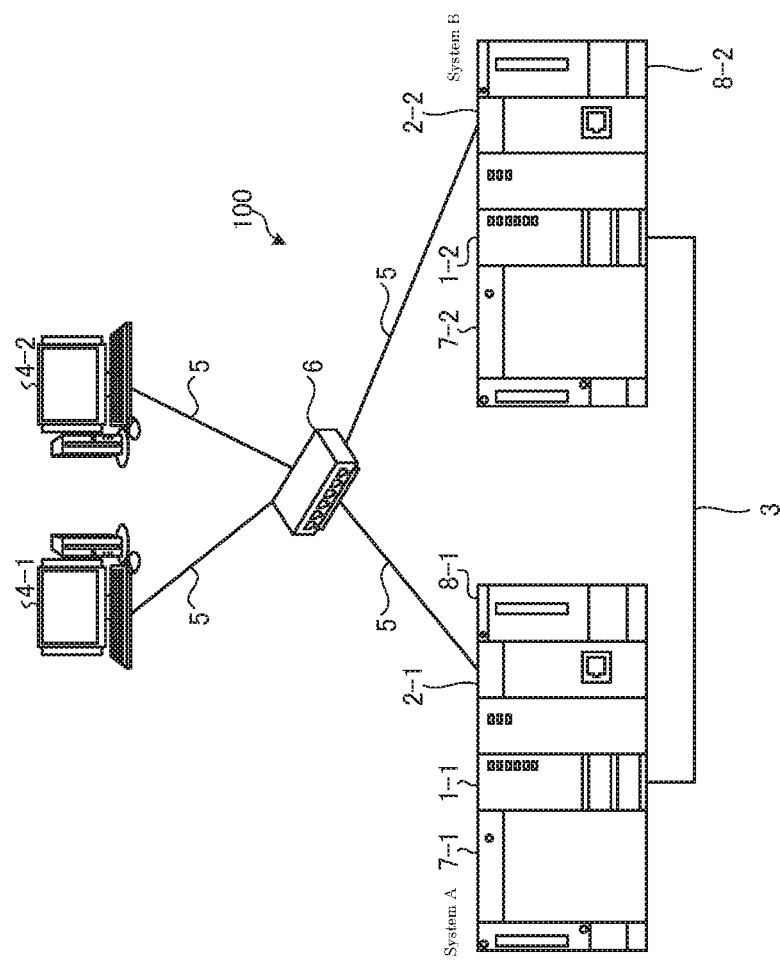
FIG. 1 is a diagram showing a configuration example of a network system.

FIG. 1 is a diagram showing a configuration example of a network system. As shown in FIG. 1, a network system 100 of the present embodiment includes a plurality of control devices 1-1 and 1-2 which are called programmable controllers, and network interface units 2-1 and 2-2 which are respectively connected to the control devices 1-1 and 1-2 and which input and output information between the control devices 1-1 and 1-2 and external devices thereof. To be specific, the network interface units 2-1 and 2-2 are communication control devices. Each of the network interface units is connected to their corresponding control device. Each of the network interface units sends information received from their corresponding control device to their external device, and sends information addressed to the control device, which is received from the external device, to the control device.

The network system 100 includes duplexed control devices to ensure high reliability, so that one of the control device 1-1 and the control device 1-2 serves as a controlling system, i.e. an active system, and the other serves as a standby system. The control device 1-1 and the control device 1-2 are connected to each other via a tracking cable 3, which is a data bus for transferring between the duplexed control devices 1-1 and 1-2, from the controlling system to the standby system, control data for controlling of the control target devices.

The network system 100 of the present embodiment further includes operator interface stations 4-1 and 4-2 to monitor the states of the control devices 1-1 and 1-2 and manage them. Namely, the operator interface stations 4-1 and 4-2 are monitoring devices for monitoring the multiple control devices. The network interface units 2-1 and 2-2 are each connected to the operator interface stations 4-1 and 4-2 via the network cables 5 and the switching hub 6.

The control device 1-1 and the network interface unit 2-1 are connected to a base unit 8-1 which supplies power provided from a power supply unit 7-1 to the control device 1-1 and the network interface unit 2-1 and also controls signal connection between the devices. The control device 1-2 and the network interface unit 2-2 are connected to a base unit 8-2 which supplies power provided from a power supply unit 7-2 to the control device 1-2 and the network interface unit 2-2 and also controls signal connection between the devices. The power supply units 7-1 and 7-2 are power sources for supplying electric power.

As described above, each of the control device, the network interface unit, the base unit, and the power supply unit is duplexed. Hereinafter, the control device, the network interface unit, the base unit, and the power supply unit whose symbols have a sub-number of "1" are collectively called system A; the control device, the network interface unit, the base unit, and the power supply unit whose symbols have a sub-number of "2" are collectively called system B.

For example, the control device 1-1 is a control device of system A. Also hereinafter, a combination of a control device, a network interface unit, a base unit, and a power supply unit is called as a control device system. Then, FIG. 1 shows an example in which the control device system is duplexed.

Each of the multiple control devices 1-1 and 1-2 is a controller called PLC. A control device set for an active system out of the control devices 1-1 and 1-2, controls the control target devices not illustrated, i.e. the devices to be controlled, via the network interface unit to which the control device itself is connected. For controlling the control target devices, any operation and any configuration may be used, and any method used in general programmable logic controllers can be applied. FIG. 1 omits illustration of components for controlling the control target devices.

It is assumed that the control device system of system A is set for the active system, in other words, that the control device of system A is set to the active system. Then, it is also assumed that a failure occurs at any one of the devices in the control device system of system A, causing the control device of system A to fail to communicate with the control target devices, i.e. causing the network interface unit of system A to leave the network. When detecting that the network interface unit of system A has left the network, the operator interface stations 4-1 and 4-2 perform an address change processing which will be later described. Through this address change processing, the control device system of system B will be set for the active system.

In a case where the control device system of system B is set for the active system, when a failure occurs at any one of the control device, the network interface unit, the base unit, and the power supply unit of system B, system A will be set for the active system through the same operation as described above.

As described above, even when a failure occurs in the active control device system, the other control device system in the duplexed control device system keeps controlling the control target devices.

In the configuration example shown in FIG. 1, the operator interface station is also duplexed in preparation for a failure of the operator interface station.

Figure 2:
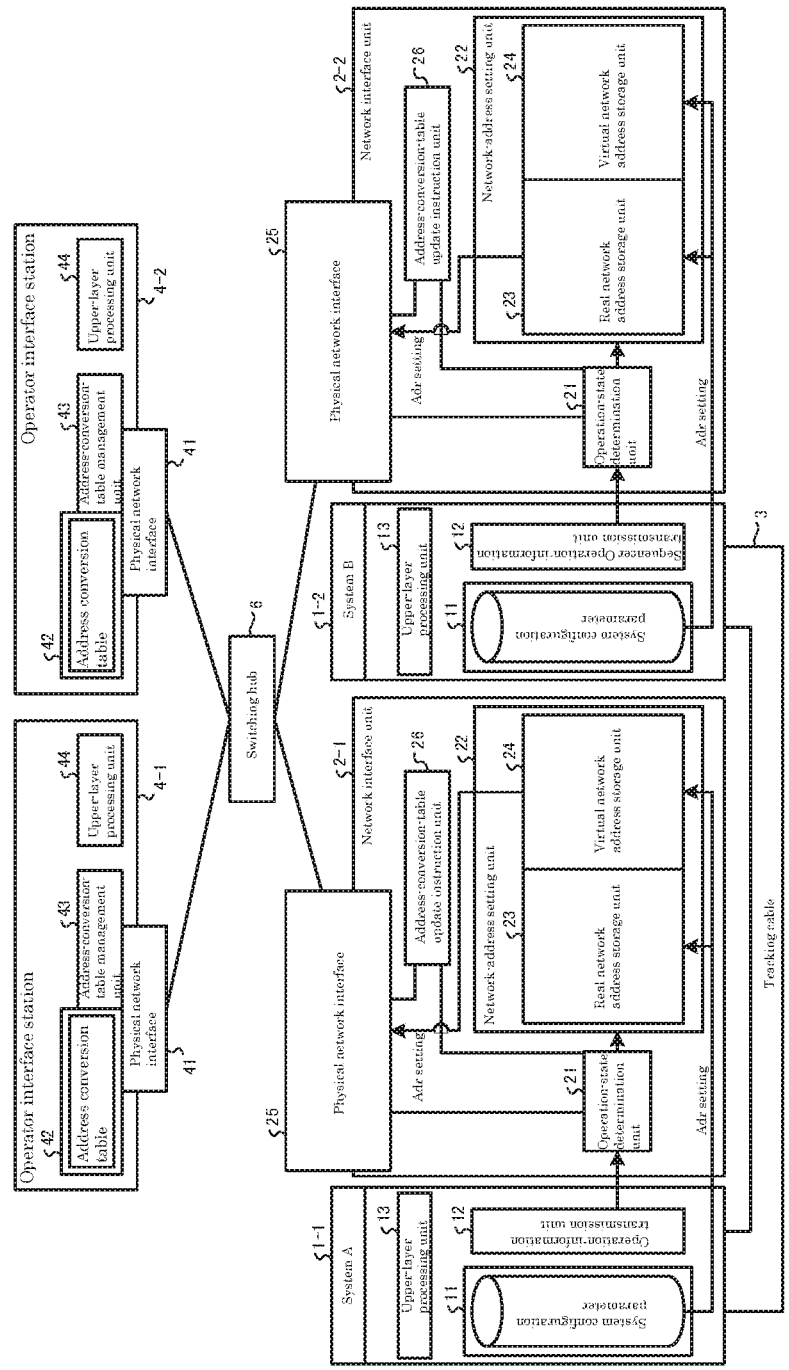
FIG. 2 is a diagram showing a functional configuration example of control devices, network interface units, and operator interface stations in the network system of an embodiment.

FIG. 2 is a diagram showing a functional configuration example of the control devices, network interface units, and operator interface stations in the network system of the embodiment.

The control devices 1-1 and 1-2 have the same configuration, and each of them includes a storage unit 11 to store system configuration parameters, an operation-information transmission unit 12, and an upper-layer processing unit 13. The system configuration parameters include information indicating virtual network addresses and information indicating real network addresses to be set to a physical network interface 25 of the network interface unit 2-1. The system configuration parameters will be described in detail later. The operation-information transmission unit 12 notifies the network interface unit 2-1 of an operation mode of the control device 1-1 indicating that the control device 1-1 is in operation either as the active system or as the non-active system, i.e. the standby system. The upper-layer processing unit 13 performs upper layer protocol processing, i.e. the processing for the network layer and upper layers. The upper-layer processing unit 13 sends data generated by the upper layer protocol processing, namely communication data, to the physical network interface 25. Therefore, the operation-information transmission units 12 serves as a unit for setting, when one of the multiple control devices is set for the active system, the other control device as the standby systems.

The network interface units 2-1 and 2-2 have the same configuration, and each of them includes an operation-state determination unit 21, a network-address setting unit 22, a physical network interface 25, and an address-conversion-table update instruction unit 26. The network-address setting unit 22 includes a real network address storage unit 23 and a virtual network address storage unit 24.

On the basis of the operation mode received from the operation-information transmission unit 12, the operation-state determination unit 21 selects an address to be set. The network-address setting unit 22 sets the real network addresses or the virtual network addresses to the physical network interface 25. For the physical network interface 25, the real network address storage unit 23 stores real network addresses, and the virtual network address storage unit 24 stores virtual network addresses. The real network address and the virtual network address will be described in detail later. The physical network interface 25 performs the physical layer and data link layer processing, with other devices. The address-conversion-table update instruction unit 26 instructs other devices to update the address conversion table.

The operator interface stations 4-1 and 4-2 have the same configuration, and each of them includes a physical network interface 41, a storage unit 42 to store an address conversion table, an address-conversion-table management unit 43, and an upper-layer processing unit 44. The upper-layer processing unit 44 sends data generated by the upper layer protocol processing, i.e. communication data, to the physical network interface 41. This upper layer protocol processing includes processing for monitoring and managing the control devices 1-1 and 1-2.

The physical network interface 41 performs processing the physical layer and data link layer processing with other devices. The address conversion table includes information in which physical addresses and logical addresses are listed. The physical address is, for example, an address called MAC (Media Access Control) address and is generally an address proper to its hardware. The logical address is, for example, an address called IP (Internet Protocol) address; and generally, the logical address may not be proper to its hardware and is assigned within the network. The operator interface stations 4-1 and 4-2 send and receive information to/from the control devices 1-1 and 1-2 via the network interface units 2-1 and 2-2 to monitor and manage the control devices 1-1 and 1-2. To make this possible, each of the address conversion tables stores corresponding relation between a physical address and a logical address for each of the physical network interfaces 25 of the network interface units 2-1 and 2-2 connected to the control devices 1-1 and 1-2, respectively. In other words, each of the address conversion tables stores the network addresses of the network interface units 2-1 and 2-2 being multiple communication control devices. Each of the address-conversion-table management units 43 updates the content of its address conversion table when receiving a request for updating the address conversion table from the network interface unit 2-1 or 2-2.

Figure 3:
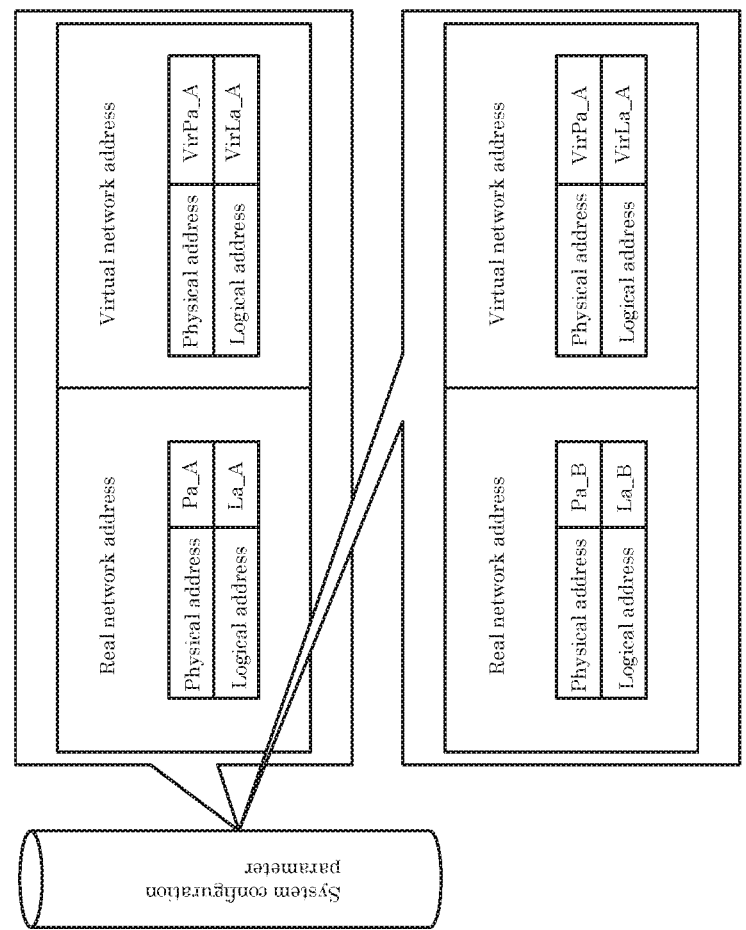
FIG. 3 is a diagram showing a data structure example of parameters for a system configuration stored in each of the control devices of the embodiment.

FIG. 3 is a diagram showing a data structure example of parameters for a system configuration stored in each of the control devices 1-1 and 1-2. In the network system of the present embodiment, system configuration parameters defined by user are stored. As shown in FIG. 3, the system configuration parameters include a combination of real network addresses and virtual network addresses for the active system, or a combination of real network addresses and virtual network addresses for the non-active system. The real network addresses are a combination of a physical network address and a logical network address, and the virtual network addresses are a combination of a physical network address and a logical network address. Hereinafter, the physical network address is called physical address, and the logical network address is called logical address.

FIG. 3 shows that with respect to the real network addresses, system A's physical address and logical address are set and denoted as Pa_A and La_A, respectively, and system B's physical address and logical address are set and denoted as Pa_B and La_B, respectively; and with respect to the virtual network addresses, the physical address and logical address are denoted as VirPa_A and VirLa_A, respectively. The physical address of the real network addresses is a proper and real physical address defined in advance for each physical network interface 25, such as a MAC address assigned to each physical network interface 25 when produced. Also, the logical address of the real network addresses is a proper and logical address defined in advance for each physical network interface 25, i.e. for each of the control devices 1-1 and 1-2. A virtual network address pair includes a physical address and a logical address which are defined in advance so that the virtual network address pair will not interfere with the real network address pairs. For any of the physical network interfaces 25, one combination of a logical address and a physical address is set as the virtual network address pair thereof.

When staring up the control device system, the network-address setting unit 22 in the network interface unit 2-1 or 2-2 respectively connected from the control device 1-1 or 1-2 is notified of the system configuration parameters. The network-address setting unit 22 extracts the real network addresses from the system configuration parameters to store them in the real network address storage unit 23 and also extracts the virtual network addresses from the system configuration parameters to store them in the virtual network address storage unit 24.

Furthermore, when staring up the control device system, the operation-information transmission unit 12 in the control device 1-1 or 1-2 notifies the operation-state determination unit 21 in the network interface unit 2-1 or 2-2 of its operation mode. In addition, it is assumed that in the initial state, system A is preset for the active system and system B is preset for the non-active system. Therefore, in the initial state, the operation-information transmission unit 12 of the control device 1-1 notifies the operation-state determination unit 21 in the network interface unit 2-1 of information indicating that its operation mode is the active system; and the operation-information transmission unit 12 of the control device 1-2 notifies the operation-state determination unit 21 in the network interface unit 2-2 of information indicating that its operation mode is the non-active system.

When notified of information indicating that its operation mode is the controlling system, the operation-state determination unit 21 instructs the network-address setting unit 22 to set the virtual network addresses. On the other hand, when notified of information indicating that its operation mode is the non-controlling system, the operation-state determination unit 21 instructs the network-address setting unit 22 to set the real network addresses. In accordance with the instruction from the operation-state determination unit 21, the network-address setting units 22 sets either the virtual network addresses or the real network addresses to the physical network interface 25. That is to say, when the connected control device is set for the active system, the network-address setting unit 22 serving as an address setting unit sets the virtual identification information to its own identification information; when the connected control device is set for the standby system, the network-address setting unit sets the proper identification information to its own identification information.

Figure 4:
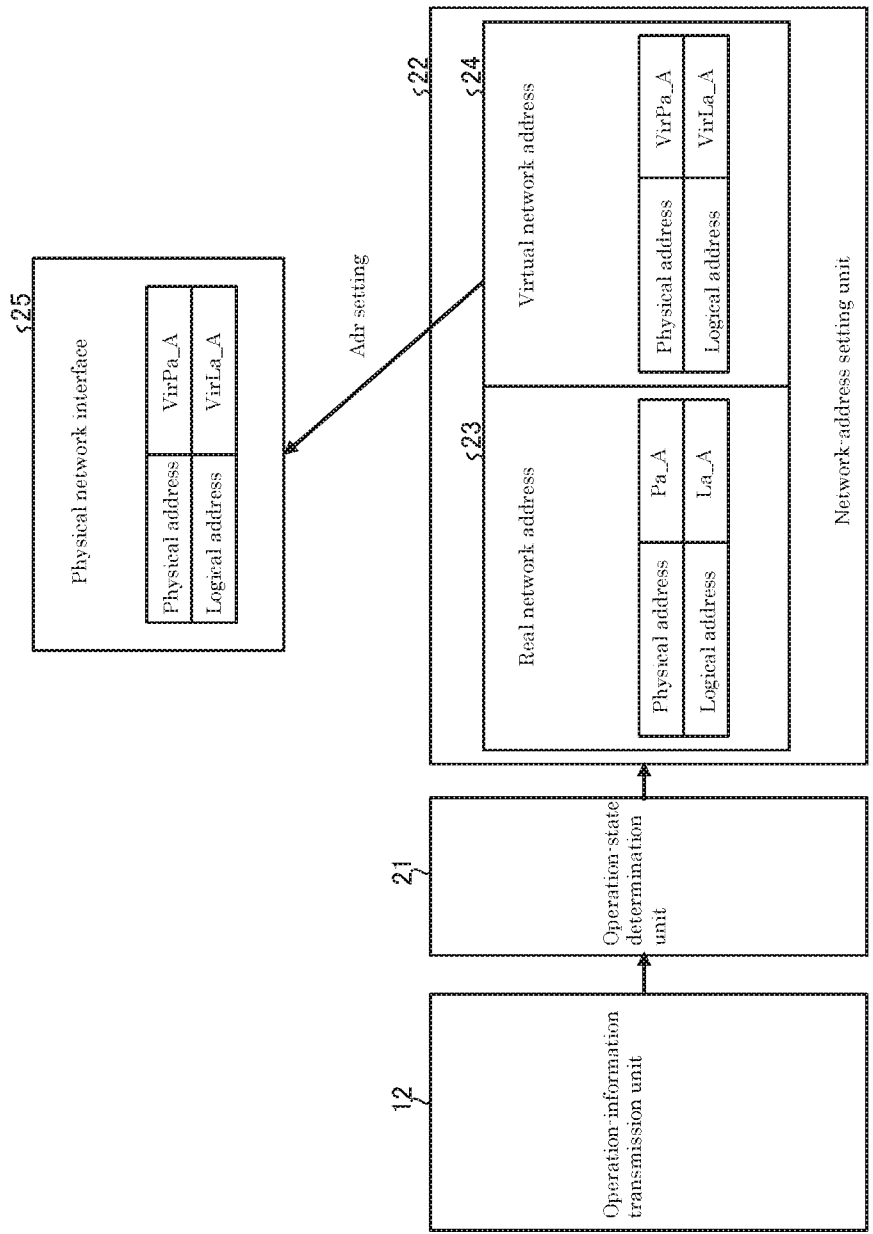
FIG. 4 is a diagram showing an address-setting example in an active system of the embodiment.

FIG. 4 is a diagram showing an address-setting example in the active system of the embodiment. As shown in FIG. 4, the network-address setting unit 22 of the active system sets the virtual network addresses to its physical network interface 25.

Figure 5:
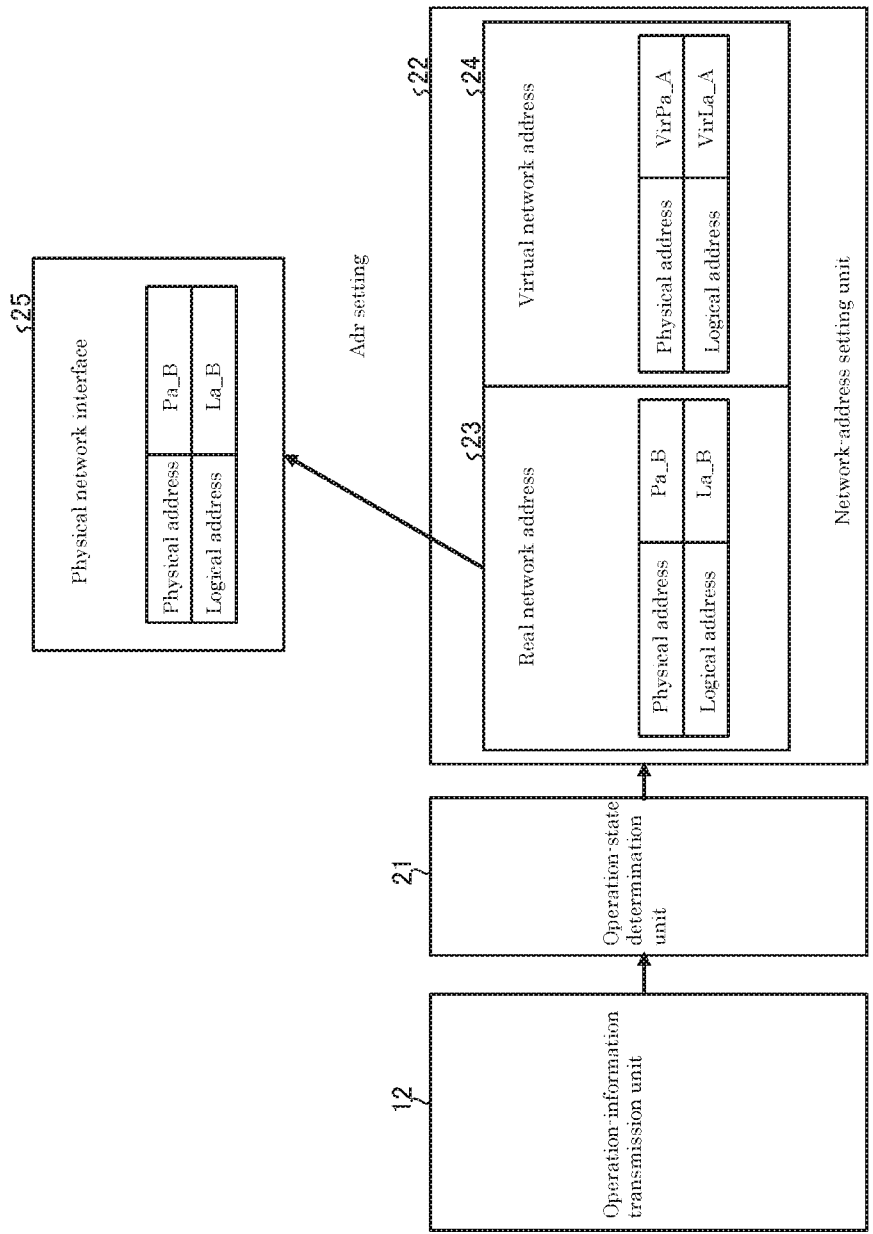
FIG. 5 is a diagram showing an address-setting example in a non-active system of the embodiment.

FIG. 5 is a diagram showing an address-setting example in the non-active system of the embodiment. As shown in FIG. 5, the network-address setting unit 22 of the non-active system sets the real network addresses to its physical network interface 25.

Figure 6:
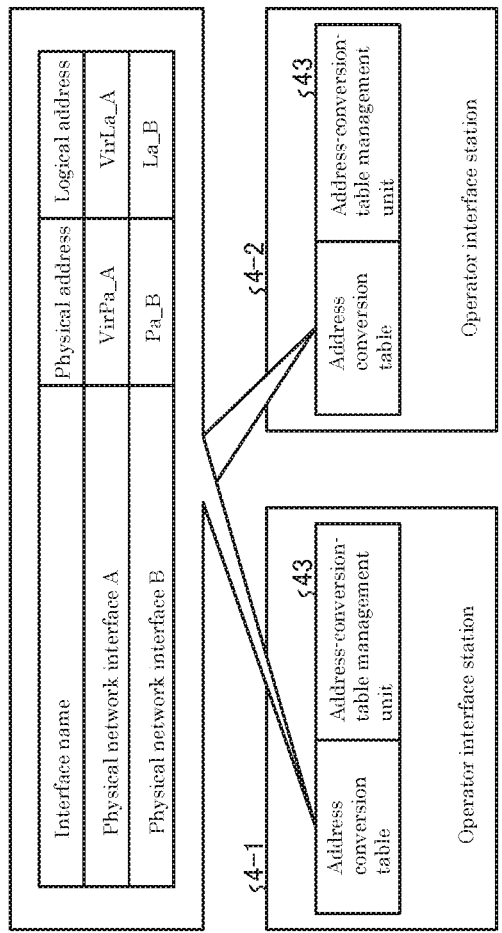
FIG. 6 is a diagram showing an example of the states of address conversion tables stored in operator interface stations of the embodiment.

FIG. 6 is a diagram showing an example of the states of the address conversion tables included in the operator interface stations 4-1 and 4-2 of the present embodiment. Each of the address conversion tables stores physical addresses and logical addresses for the physical network interfaces 25 of the network interface units 2-1 and 2-2.

Note that, in FIG. 6, names of the physical network interfaces are given in the address conversion tables. But the names of the physical network interfaces are not necessarily needed in the actual address conversion tables. In a case where a name is given to each physical network interface to store a pair of a logical address and physical address in the address conversion table, information indicating the physical network interface's name is included in the data part or other part of the communication frame described later. In FIG. 6, the name of the physical network interface 25 in the network interface unit 2-1 is "Physical network interface A", and the name of the physical network interface 25 in the network interface unit 2-2 is "Physical network interface B".

When receiving a request for updating the address conversion table from the network interface unit 2-1 or 2-2, each of the address-conversion-table management units 43 updates the contents of its address conversion table. As described later, a request for updating the address conversion table will be sent out from one of the network interface units 2-1 and 2-2 when detecting a failure of the other network interface unit.

Figure 7:
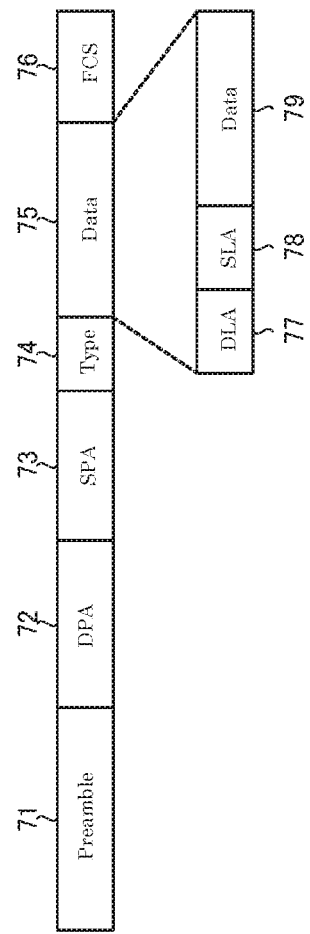
FIG. 7 is a diagram showing a configuration example of a communication frame of the embodiment.

FIG. 7 is a diagram showing a configuration example of a communication frame of the present embodiment. As shown in FIG. 7, the communication frame according to the present embodiment includes a preamble 71, DPA (Destination Physical Address) 72, SPA (Source Physical Address) 73, Type 74, Data 75, and FCS (Frame Check Sequence) 76. The physical network interfaces 25 generates a communication frame on the basis of the data received from its upper-layer processing unit 13 and sends it out. The physical network interfaces 41 generates a communication frame on the basis of the data received from its upper-layer processing unit 44 and sends it out. The preamble 71 is a specific series of bits used for synchronizing in transmission and reception and indicating the start of a frame. The preamble 71 is added in transmission, and discarded in reception.

DPA 72 contains a physical destination address. In the present embodiment, the address of a physical network interface being the communication counterpart or its destination is set in DPA 72. SPA 73 contains the physical address of its transmission source. In the present embodiment, the address of the physical network interface of the transmission source is set in SPA 73.

Type 74 contains information for identifying an upper layer protocol corresponding to the data stored in the next following field of Data 75. In other words, Type 74 contains information for identifying an upper layer protocol according to which Data 75 is generated. Data 75 includes DLA (Destination Logical Address) 77, SLA (Source Logical Address) 78, and data 79. DLA 77 is a logical destination address. In the present embodiment, the logical address of a physical network interface being its communication counterpart is set in DLA 77. The logical address of the physical network interface sending data is set in SLA 78. Data 79 contains communication data generated according to the upper layer protocol. FCS 76 contains redundant information added for checking whether the received frame has an error or not.

In the present embodiment, all components including network interfaces are duplexed. Therefore, even when a failure occurs in any device in one of the systems, the other system can be used, ensuring the robustness. However, because different addresses are set to the respective network interfaces, if all components are simply duplexed, it becomes necessary for the operator interface stations to change the settings in a case where the network interface of the active system fails and then the redundant system's network interface serves as the active system. In the present embodiment, virtual network addresses are introduced; the virtual network addresses are used for the network interface unit set for the active system regardless of which network interface unit hardware is set for the active system. That is to say, the virtual network addresses do not depend on hardware. Therefore, even when switching hardware being set as the network interface unit of the active system, in other words even when switching hardware corresponding to virtual network addresses, the operator interface stations can keep on communicating, using the same addresses as those used before the switching operation. Generally, applications in the operator interface stations use logical addresses such as IP addresses. Therefore, in order to keep communicating even when the network interface fails, it is generally necessary that the physical address and logical address corresponding to the network interface hardware used in a post-switching state are set to the operator interface station. In the present embodiment, because virtual network addresses are used for both of the logical address and the physical address, it is possible to keep communicating independently from switching the active system's network interface, using the same virtual network addresses for both of the logical address and the physical address. That is to say, by duplexing all components and using the virtual network addresses as described above, the system robustness can be ensured without adding a special function to the network interface units. The real network addresses are used for the non-active system's network interface; therefore, the operator interface stations can also communicate with the non-active system's network interface.

Figure 8:
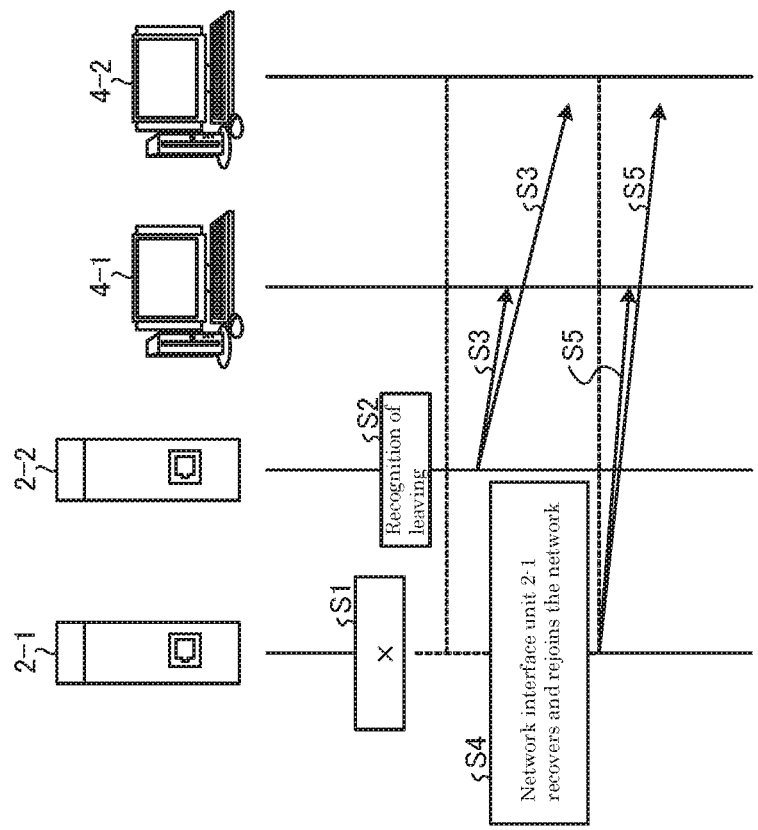
FIG. 8 is a chart diagram showing an operation example to be performed when a control device system of system A fails in the network system of the embodiment.

FIG. 8 is a chart diagram showing an operation example to be performed when the control device system of system A fails in the network system of the present embodiment. First, a failure occurs in the control device system of system A, and then, the network interface unit 2-1 stops transmission (step S1). There may be various possibilities for the cause of the failure in the control device system of system A. The failure may be caused by a hardware failure in the control device 1-1, the network interface unit 2-1, the power supply unit 7-1, or the base unit 8-1, or by disconnection of the cable connecting components of the control device system.

The network interface unit 2-2 detects an anomalous state of the network interface unit 2-1 and determines that the network interface unit 2-1 has left the network (step S2). To be more specific, when the operation-state determination unit 21 of the network interface unit 2-2 detects, via its physical network interface 25, that the network interface unit 2-1 has not transmitted for a certain period or longer, then, the operation-state determination unit determines that the network interface unit 2-1 is anomalous. Here, it is assumed, for example, that the network interface unit 2-1 performs transmission periodically. When the operation-state determination unit 21 determines that the network interface unit 2-1 is anomalous, it instructs its address-conversion-table update instruction unit 26 to request the operator interface stations 4-1 and 4-2 to update their address conversion tables.

The network interface unit 2-2 changes its physical address and logical address to those of the virtual address and sends a request for updating the address conversion table to each of the operator interface stations 4-1 and 4-2 (step S3). The request for updating the address conversion table is sent using the communication frame shown in FIG. 7. To be more specific, when requesting for updating the address conversion tables, the network interface unit 2-2 generates a communication frame indicating a request for updating the address conversion table, and stores the physical address and logical address being set to itself, in the communication frame. In each of the operator interface stations 4-1 and 4-2, the address-conversion-table management unit 43 updates the address conversion table on the basis of the request for updating the address conversion table. Details of the operation for updating the address conversion table in each of the operator interface stations 4-1 and 4-2 will be described later.

Next, when the control device system of system A recovers from the failure, the network interface unit 2-1 rejoins the network, i.e. the network interface unit 2-1 restarts transmission (step S4). In addition, when the control device system of system A recovers from the failure, the control device 1-1 for example receives from the control device 1-2 through the tracking cable 3, data being sent from the active system to the standby system, whereby the control device 1-1 grasps that the control device 1-2 is in operation as the active system. Then, the operation-information transmission unit 12 of the control device 1-1 notifies the network interface unit 2-1 of information indicating that its operation mode is the standby system; whereby the network interface unit 2-1 recognizes that the network interface unit 2-2 is in operation as the active system. Then, the network interface unit 2-1 changes its physical address and logical address to those of its real address and sends a request for updating the address conversion table to the operator interface stations 4-1 and 4-2 (step S5). Details of the operation after failure recovery of the network interface unit 2-1 will be described later.

In FIG. 8, an example has been explained in which the control device system of system A has been set for the active system and then a failure occurs in the control device system of system A. In a case where the control device system of system B has been in operation as the active system and then a failure occurs in the control device system of system B, the network interface unit 2-1 of system A detects that the control device system of system B is anomalous and sends a request for updating the address conversion table to the operator interface stations 4-1 and 4-2.

Figure 9:
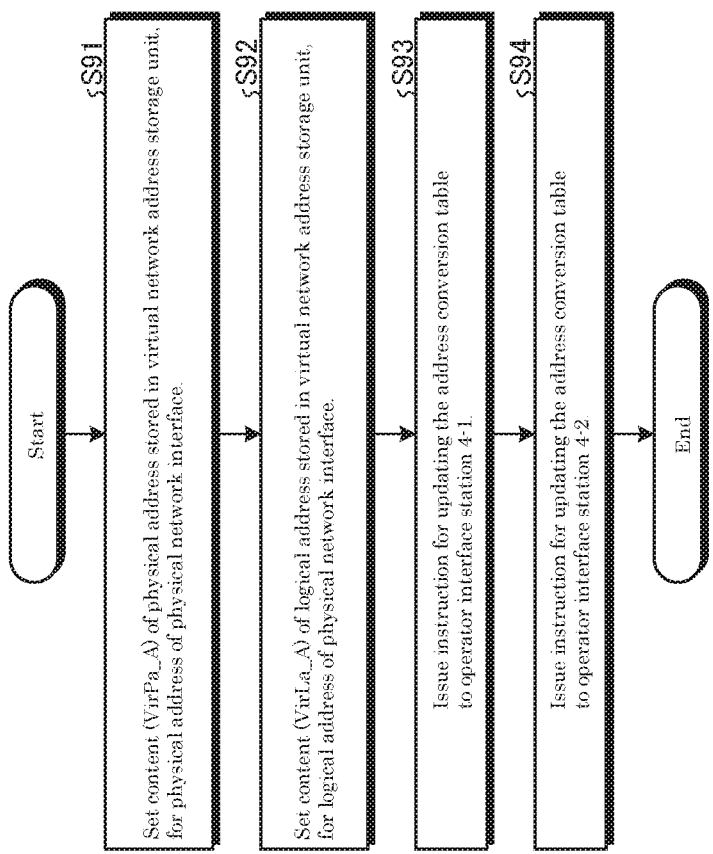
FIG. 9 is a flowchart showing an operation example of a network interface unit of system B when a failure is detected in the control device system of system A.

FIG. 9 is a flowchart showing an operation example of the network interface unit 2-2 of system B when a failure is detected in the control device system of system A. When the network interface unit 2-2 detects that the network interface unit 2-1 is anomalous, the network interface unit 2-2 sets VirPa_A being the physical address stored in its virtual network address storage unit 24, to the physical address of its physical network interface 25 (step S91). To be more specific, when detecting that the network interface unit 2-1 is anomalous, the operation-state determination unit 21 of the network interface unit 2-2 instructs its network-address setting unit 22 to set VirPa_A being the physical address stored in its virtual network address storage unit 24, to the physical address of its physical network interface 25. In accordance with the instruction, the network-address setting unit 22 sets VirPa_A to the physical address of the physical network interface 25.

Next, the network interface unit 2-2 sets VirLa_A being the logical address stored in the virtual network address storage unit, to the logical address of its physical network interface 25 (step S92). To be more specific, the operation-state determination unit 21 of the network interface unit 2-2 instructs its network-address setting unit 22 to set VirLa_A being the logical address stored in its virtual network address storage unit to the logical address of its physical network interface 25. In accordance with the instruction, the network-address setting unit 22 sets VirLa_A to the logical address of the physical network interface 25.

Next, the network interface unit 2-2 issues an instruction for updating the address conversion table to the operator interface station 4-1 (step S93). To be more specific, when determining that the network interface unit 2-1 is anomalous, the operation-state determination unit 21 instructs its address-conversion-table update instruction unit 26 to send a request for updating the address conversion table to the operator interface station 4-1. Then, in accordance with the instruction, the address-conversion-table update instruction unit 26 sends the request for updating the address conversion table via its physical network interface 25.

Similarly, the network interface unit 2-2 issues the instruction for updating the address conversion table to the operator interface station 4-2 (step S94).

Figure 10:
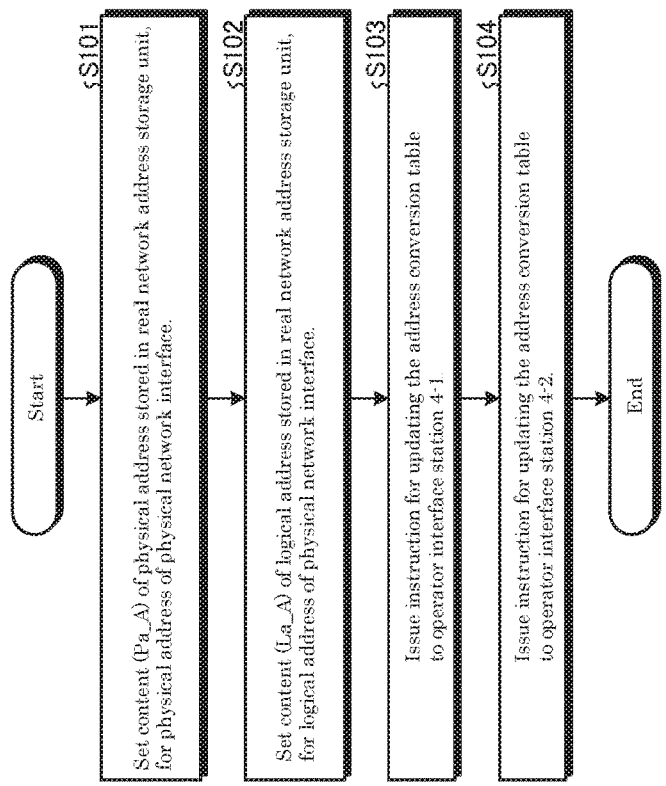
FIG. 10 is a flowchart showing an operation example of the network interface unit of the embodiment after recovering from the failure.

FIG. 10 is a flowchart showing an operation example of the network interface unit 2-1 of the present embodiment after recovering from the failure. In a case where the control device system of system A having been set for the active system fails and then the control device system of system A recovers, the network interface unit 2-1 becomes in a communicable state again. Then, the control device 1-1, for example, receives from the control device 1-2 through the tracking cable 3 data being sent from the active system to the standby system, whereby the control device 1-1 grasps that the control device 1-2 is in operation as the active system.

And then, the operation-information transmission unit 12 of the control device 1-1 notifies the network interface unit 2-1 of information indicating that its operation mode is the standby system, i.e. the non-active system. Thus, the network interface unit 2-1 determines that it is set for the non-active system, i.e. the standby system, and sets Pa_A being the physical address stored in its real network address storage unit 23, to the physical address of its physical network interface 25 (step S101). To be more specific, the operation-state determination unit 21 instructs its network-address setting unit 22 to set Pa_A being the physical address stored in its real network address storage unit 23, to the physical address of its physical network interface 25. In accordance with the instruction, the network-address setting unit 22 sets Pa_A to the physical address of the physical network interface 25. In addition, at a stage just after the recovery, the control device system of system A remains in the setting condition before the failure; therefore, the control device system of system A is still in the state of the active system.

The network interface unit 2-1 sets La_A being the logical address stored in its real network address storage unit 23, to the logical address of its physical network interface 25 (step S102). To be more specific, the operation-state determination unit 21 instructs its network-address setting unit 22 to set La_A being the logical address stored in its real network address storage unit 23 to the logical address of its physical network interface 25. In accordance with the instruction, the network-address setting unit 22 sets La_A to the logical address of its physical network interface 25.

Next, the network interface unit 2-1 transmits issues the instruction for updating the address conversion table to the operator interface station 4-1 (step S103). To be more specific, the operation-state determination unit 21 instructs its address-conversion-table update instruction unit 26 to send the request for updating the address conversion table to the operator interface station 4-1. Then, in accordance with the instruction, the address-conversion-table update instruction unit 26 sends a request for updating the address conversion table through its physical network interface 25 as a communication frame. In other words, the address-conversion-table update instruction unit 26 serving as an address update unit requests an update of the address conversion table to the operator interface station 4-1 on the basis of the network address set by the network-address setting unit 22.

Next, similarly, the network interface unit 2-1 issues an instruction for updating the address conversion table to the operator interface station 4-2 (step S104).

Figure 11:
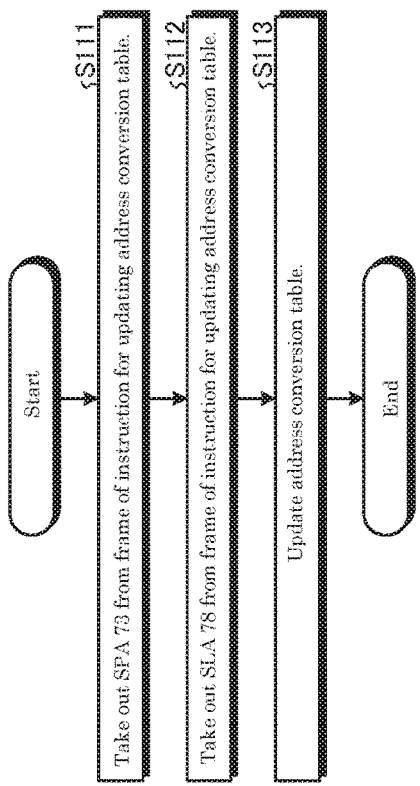
FIG. 11 is a flowchart showing an example of a processing procedure for updating the address conversion table in an operator interface station.

FIG. 11 is a flowchart showing an example of a processing procedure for updating the address conversion table in each of the operator interface stations 4-1 and 4-2. Here, explanation will be made about the operation of the operator interface station 4-1; and the same explanation is applied to the operation of the operator interface station 4-2. When receiving through the physical network interface 41 a communication frame of the instruction for updating the address conversion table, the address-conversion-table management unit 43 of the operator interface station 4-1 takes out SPA 73 from the communication frame (step S111). Also, the address-conversion-table management unit 43 of the operator interface station 4-1 takes out SLA 78 from the communication frame of the instruction for updating the address conversion table (step S112).

Then, the address-conversion-table management unit 43 of the operator interface station 4-1 recognizes that SPA 73 and SLA 78 taken out from the communication frame are, respectively, the physical address and the logical address of the network interface unit of the transmission source instructing for updating the address conversion table, and then, updates its address conversion table (step S113).

To be more specific, in a case when the communication frame contains the name of a physical network interface, the address-conversion-table management unit 43 of the operator interface station 4-1 updates the logical address and physical address that correspond to the name of the physical network interface in the address conversion table, respectively to SPA 73 and SLA 78 taken out in step S111 and step S112.

In a case when the address conversion table does not include the name of a physical network interface, that is, in a case when the communication frame does not include information indicating the name of a physical network interface, the address conversion table will be changed as follows. When SPA 73 and SLA 78 taken out in step S111 and step S112 are virtual network addresses, and neither of them is stored as a physical address and a logical address of the virtual network addresses in the address conversion table, the address-conversion-table management unit 43 adds SPA 73 and SLA 78 taken out in step S111 and step S112, to the address conversion table. When SPA 73 and SLA 78 taken out in step S111 and step S112 are virtual network addresses, and when a physical address and a logical address of the virtual network addresses are already stored in the address conversion table, the address-conversion-table management unit 43 does not change the address conversion table. In the present embodiment, an operation where no change is actually made in the content of the table because the address has already been recorded, is also referred as an update of the address conversion table.

In a case where SPA 73 and SLA 78 taken out in step S111 and step S112 are not virtual network addresses, and both of them are stored as a physical address and a logical address in the address conversion table, the address-conversion-table management unit 43 does not change the address conversion table. When SPA 73 and SLA 78 taken out in step S111 and step S112 are not virtual network addresses, and neither of them is stored as a physical address and logical address in the address conversion table, the address-conversion-table management unit 43 adds the physical address and logical address to the address conversion table. The physical address of the real network addresses is a real physical address proper to the physical network interfaces 25. Therefore, even when the real network addresses of the physical network interface 25 corresponding to a network interface unit unable to transmit due to failure remain in the address conversion table, the same physical address is not used as a transmission source from other devices to transmit a communication frame, thereby causing no problem.

In the network system of the present embodiment where the control device is multiplexed, the control device system is fully duplexed by setting addresses as described above, to ensure robustness of the entire network system. Furthermore, the operator interface stations 4-1 and 4-2 only need to update their address conversion tables in response to a request for updating the address conversion table; therefore, it suffices for duplexing the control device system that just a few functions are added to the operator interface stations 4-1 and 4-2.

Figure 12:
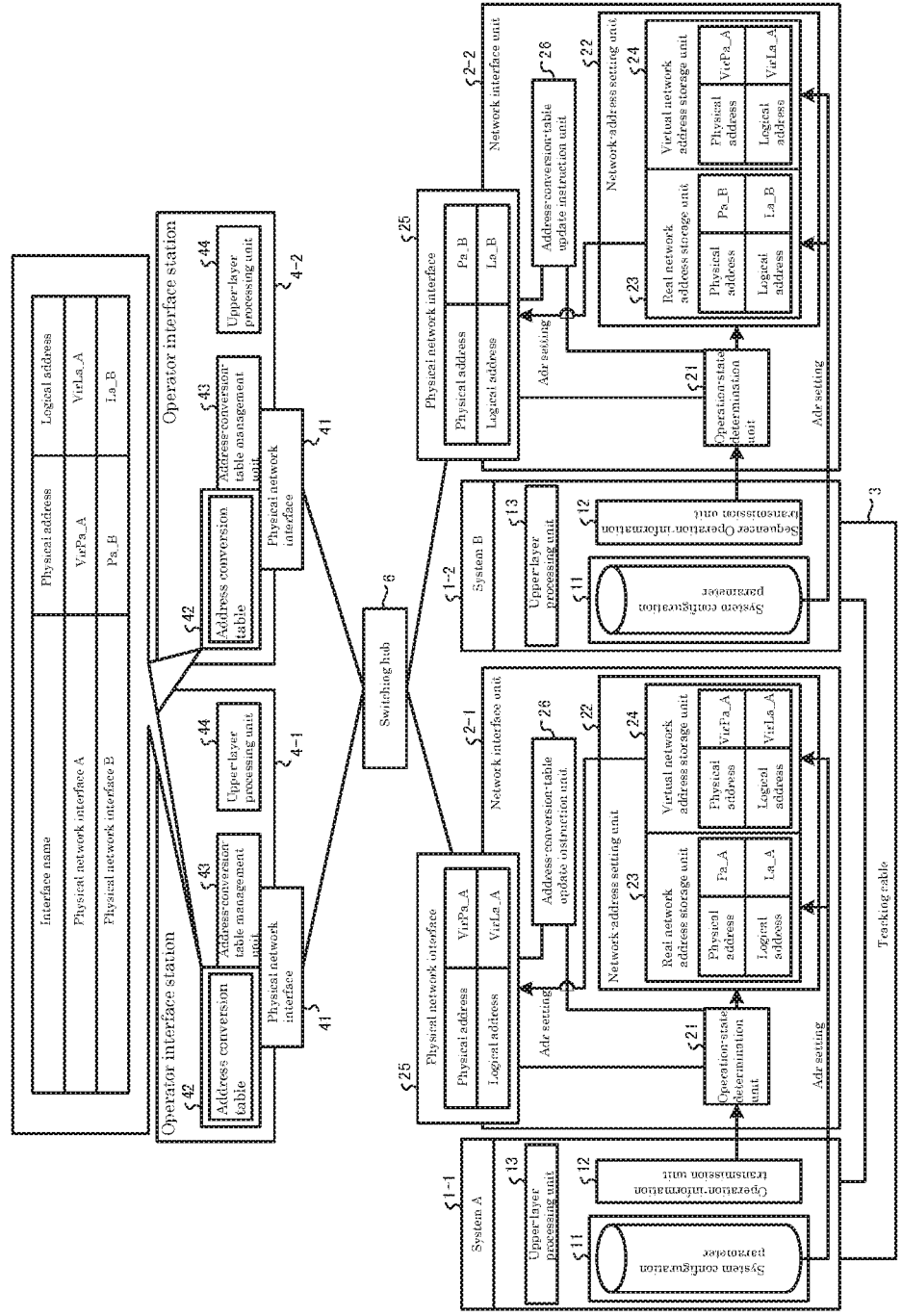
FIG. 12 is a diagram showing address examples being set to respective devices when system A is set for the active system in the network system of the embodiment.

FIG. 12 is a diagram showing address examples being set to respective devices when system A is set for the active system in the network system of the present embodiment. As shown in FIG. 12, a physical address VirPa_A of the virtual network addresses and a logical address VirLa_A of the virtual network addresses are set in the physical network interface 25 of system A. A physical address Pa_B of the real network addresses and a logical address La_B of the real network addresses are set in the physical network interface 25 of system B. Also, in the operator interface stations 4-1 and 4-2, the physical address VirPa_A and the logical address VirLa_A are set for entries corresponding to the physical network interface 25 of system A; the physical address Pa_B and the logical address La_B are set for entries corresponding to the physical network interface 25 of system B.

Figure 13:
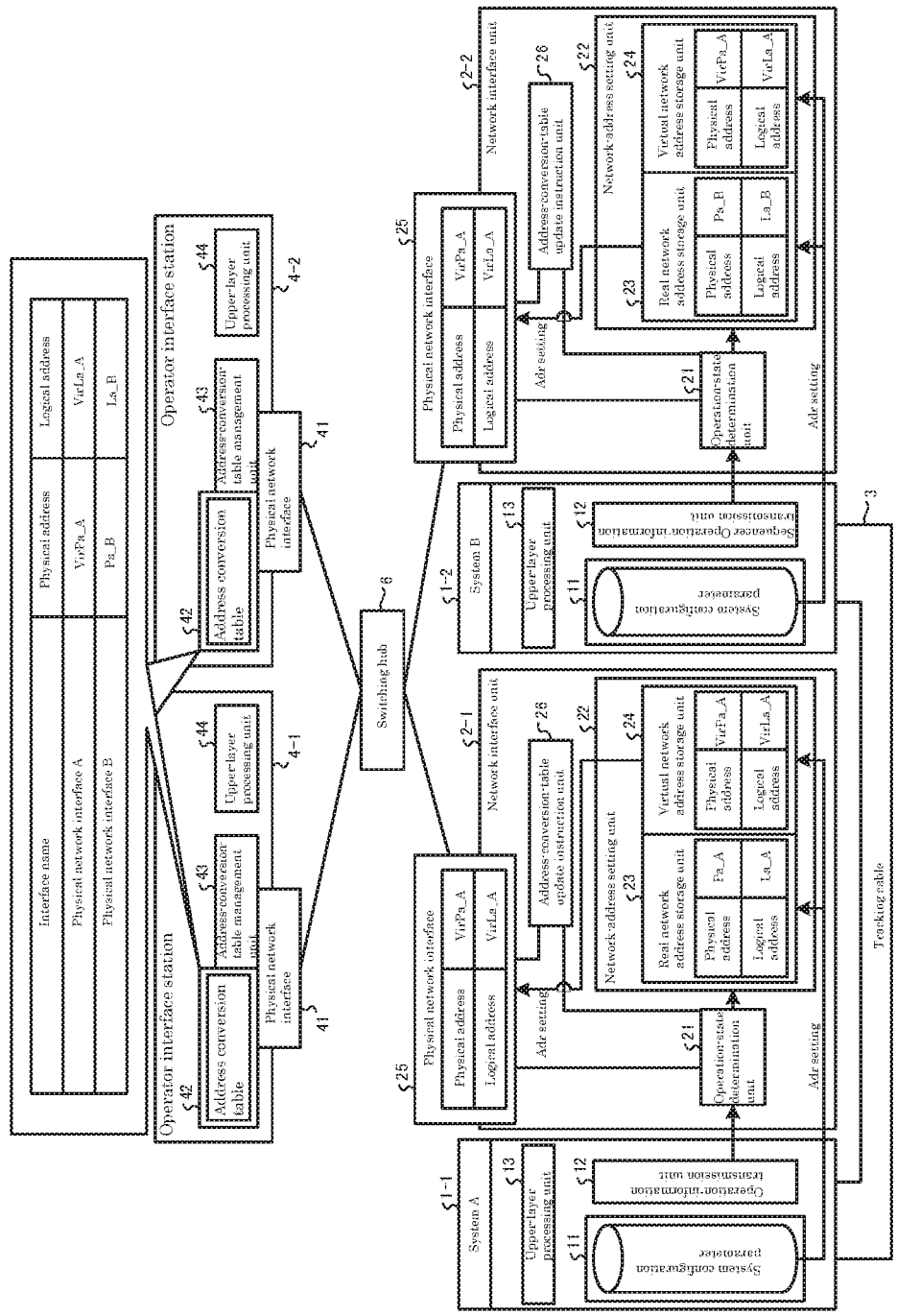
FIG. 13 is a diagram showing address examples to be set to respective devices after a failure occurs in system A in the network system of the embodiment.

FIG. 13 is a diagram showing address examples to be set to respective devices after a failure occurs in system A in the network system of the present embodiment. FIG. 13 shows a state in which the network interface unit 2-2 has detected a failure in system A and has changed the address of its physical network interface 25, but has not yet sent a request for updating the address conversion table to the operator interface stations 4-1 and 4-2. As shown in FIG. 13, the physical address VirPa_A of the virtual network addresses and the logical address VirLa_A of the virtual network addresses are set in the physical network interface 25 of the network interface unit 2-2.

Figure 14:
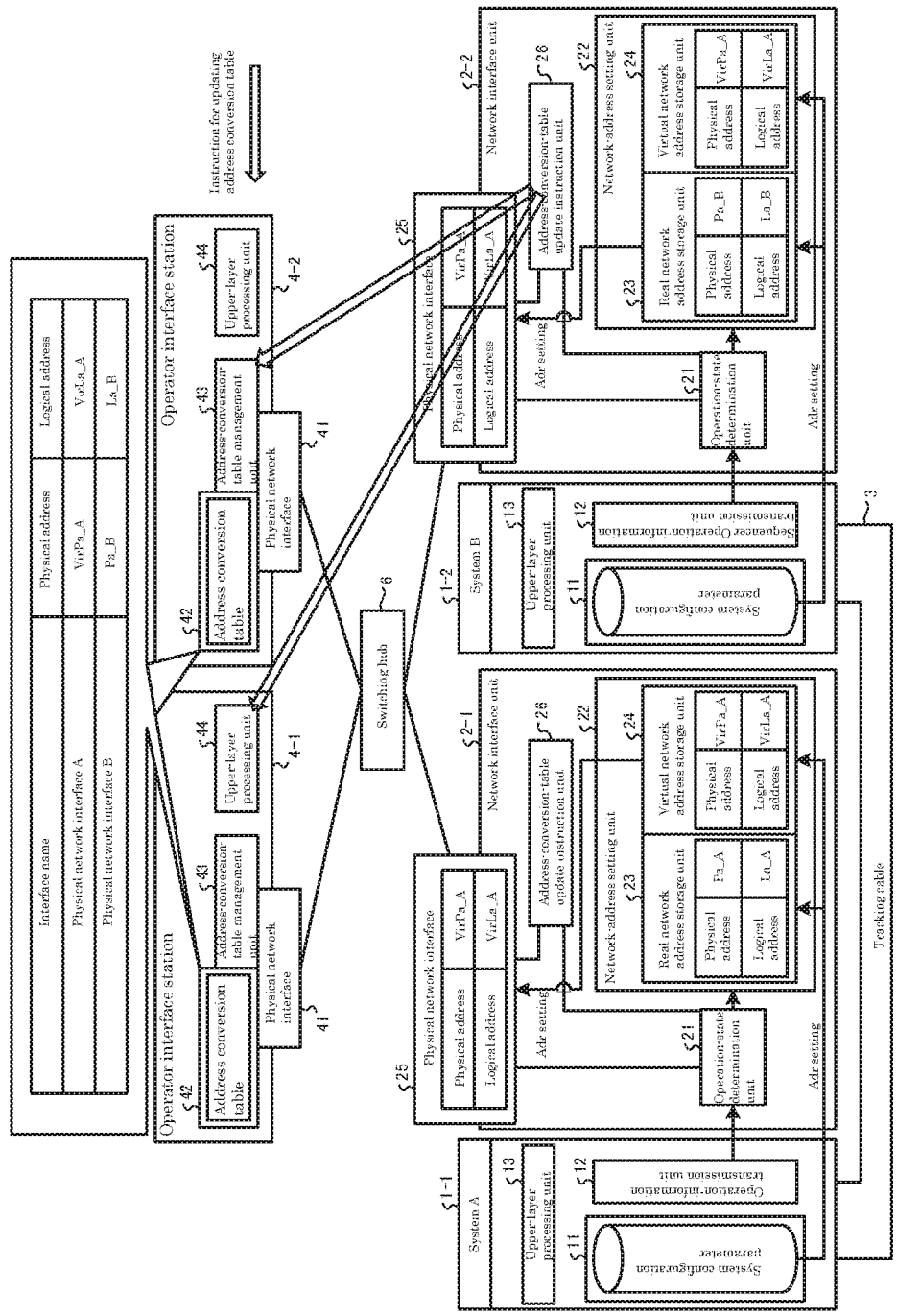
FIG. 14 is a diagram showing a state of the network system of the embodiment, in which the network interface unit sends requests for updating the address conversion tables after a failure occurs in system A.

FIG. 14 is a diagram showing a state of the network system of the embodiment, in which the network interface unit 2-2 sends requests for updating the address conversion tables after the failure occurred in system A. As described above, when detecting a failure in system A, the network interface unit 2-2 changes the addresses of its physical network interface 25, and then, sends requests for updating the address conversion tables to the operator interface stations 4-1 and 4-2.

Figure 15:
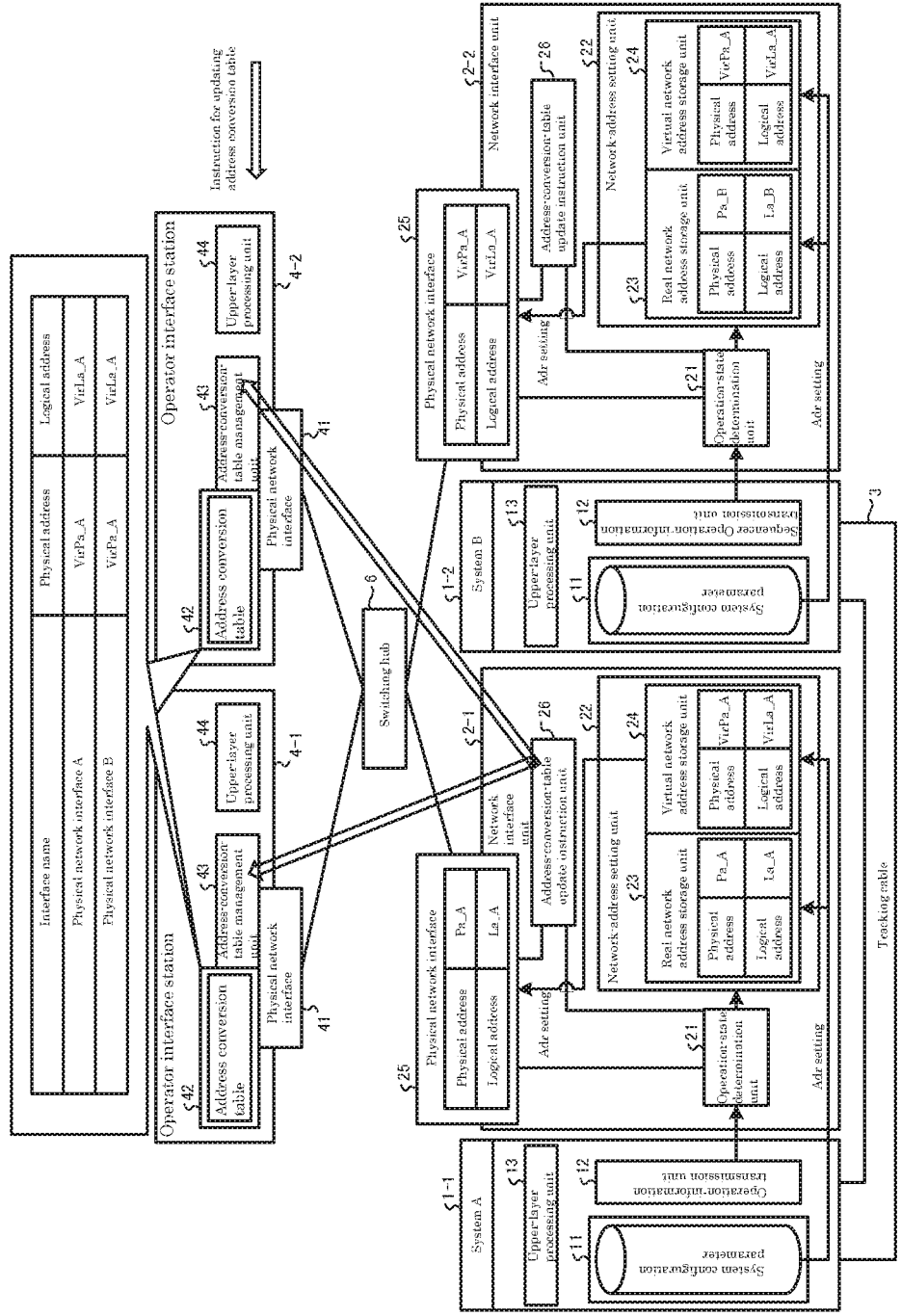
FIG. 15 is a diagram showing address examples to be set to respective devices after system A recovers from the state shown in FIG. 14.

FIG. 15 is a diagram showing address examples to be set to respective devices after system A recovers from the state shown in FIG. 14. In the state shown in FIG. 15, the operator interface stations 4-1 and 4-2 have already updated their address conversion tables by the reception of the requests for updating the address conversion tables, which have been explained in FIG. 14. Thus, in the address conversion tables of the operator interface stations 4-1 and 4-2, the physical address VirPa_A of the virtual network addresses and the logical address VirLa_A of the virtual network addresses are set for entries corresponding to the physical network interface 25 of the network interface unit 2-2. Also, after system A recovers, the network interface unit 2-1 recognizes that system B is in operation as the active system, and thus sets the real network addresses to its physical network interface 25 so as to operate as the non-active system. Then, the network interface unit 2-1 sends requests for updating the address conversion tables to the operator interface stations 4-1 and 4-2.

Figure 16:
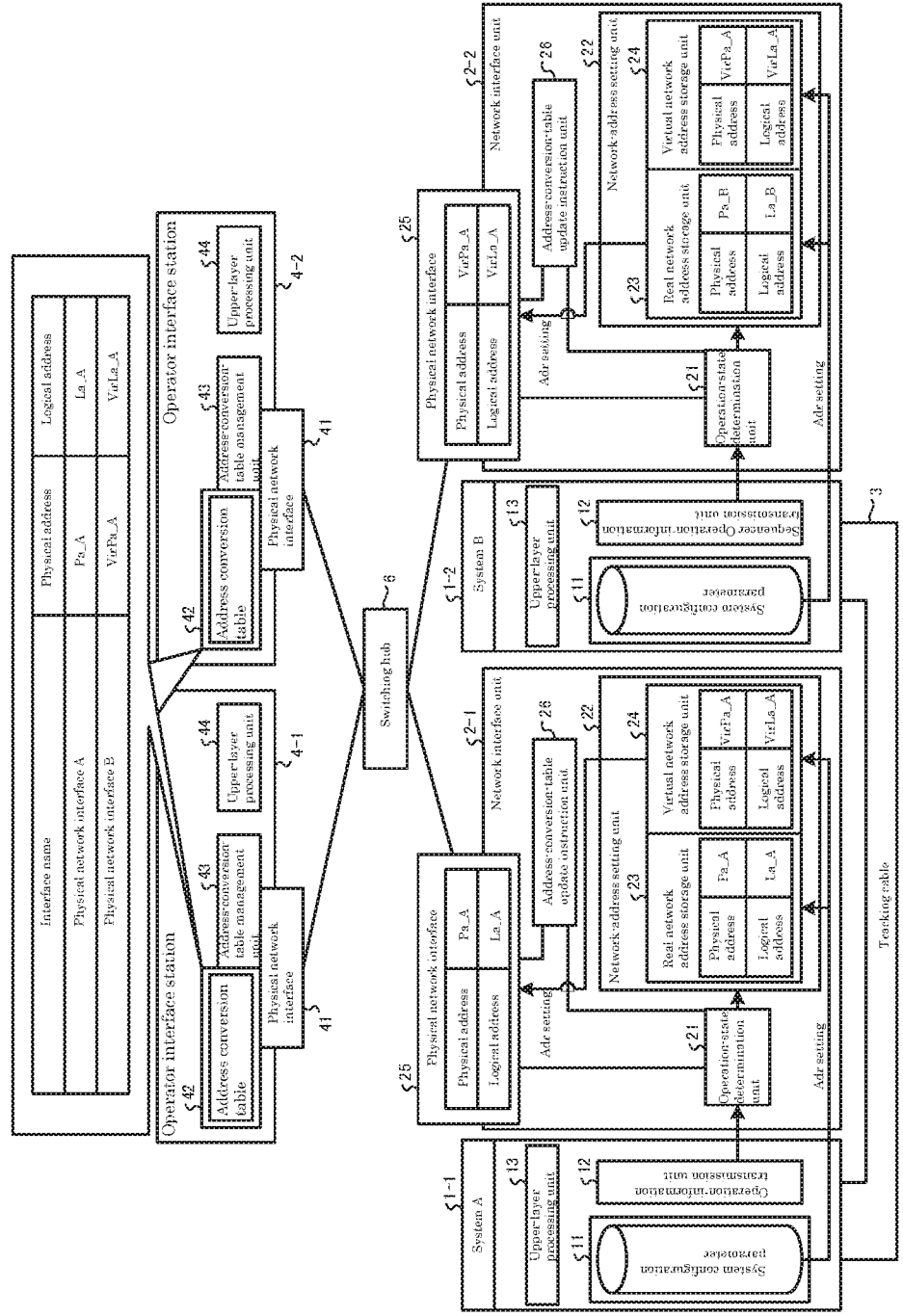
FIG. 16 is a diagram showing the state following the state shown in FIG. 15, in which the operator interface stations have updated the address conversion tables in response to the requests for updating the address conversion tables.

FIG. 16 is a diagram showing a state in which, after the state shown in FIG. 15, the operator interface stations 4-1 and 4-2 have updated the address conversion tables in response to the requests for updating the address conversion tables. As shown in FIG. 15, the network interface unit 2-1 sends requests for updating the address conversion tables to the operator interface stations 4-1 and 4-2. FIG. 16 shows a state in which, through these requests, the operator interface stations 4-1 and 4-2 have updated the address conversion tables.

Through the operations described above, the active system is switched from system A to system B, so that system A is set to operate as the non-active system. In the present embodiment, the address setting method as described above is adopted; therefore, in a case where it is expected for maintenance or the like that the operator interface stations 4-1 and 4-2 communicate with system A of the non-active system, such communication is possible by using the real network addresses. Also, when the same virtual network addresses are set in system A and system B, the logical address and the physical address used in the active system are not changed even when the active system is switched from system A to system B. This allows the operator interface stations 4-1 and 4-2 to use the same addresses for continuing their communication with the active system regardless of which network interface is the active system between system A and system B.

Next, explanation will be made about the hardware configurations of the control devices 1-1 and 1-2, the network interface units 2-1 and 2-2, and the operator interface stations 4-1 and 4-2 of the present embodiment.

Figure 17:
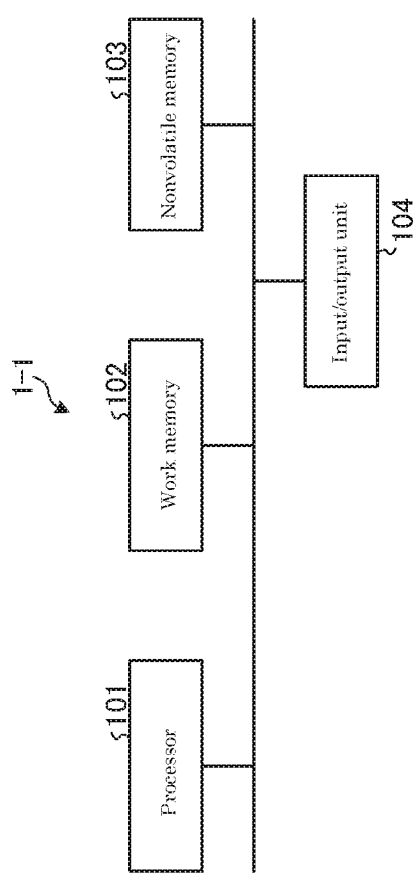
FIG. 17 is a diagram showing a hardware configuration example of the control device of the embodiment.

FIG. 17 is a diagram showing a hardware configuration example of the control device 1-1 of the embodiment. As shown in FIG. 17, the control device 1-1 of the present embodiment includes a processor 101, a work memory 102, a nonvolatile memory 103, and an input/output unit 104. The processor 101 is, for example, a CPU (Central Processing Unit) or a microprocessor.

The storage unit 11 shown in FIG. 2 is realized by the nonvolatile memory 103 shown in FIG. 17. The nonvolatile memory 103 is, for example, a hard disk drive or an SSD (Solid State Drive). The work memory 102 is a temporary memory used for the processor 101 to execute processing, and is, for example, a RAM (Random Access Memory).

The operation-information transmission unit 12 and the upper-layer processing unit 13 shown in FIG. 2 are realized by the processor 101 shown in FIG. 17. The programs coded for the operations of the operation-information transmission unit 12 and the upper-layer processing unit 13 are stored in the nonvolatile memory 103. The processor 101 reads out and executes those programs, to realize the operation-information transmission unit 12 and the upper-layer processing unit 13. The operation-information transmission unit 12 and the upper-layer processing unit 13 send information to the network interface unit 2-1 via the input/output unit 104. Also, the system configuration parameters stored in the storage unit 11 are sent to the network interface unit 2-1 via the input/output unit 104. The hardware configuration of the control device 1-2 is the same as that of the control device 1-1.

Figure 18:
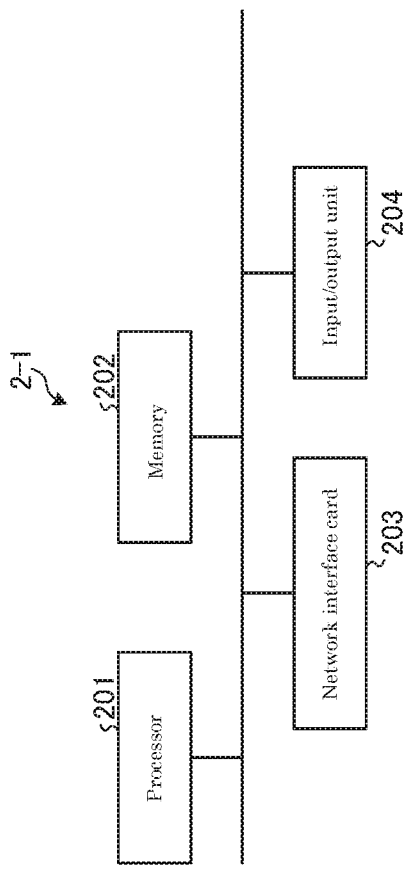
FIG. 18 is a diagram showing a hardware configuration example of the network interface unit of the embodiment.

FIG. 18 is a diagram showing a hardware configuration example of the network interface unit 2-1 of the embodiment. As shown in FIG. 18, the network interface unit 2-1 of the present embodiment includes a processor 201, a memory 202, a network interface card 203, and an input/output unit 204. The processor 201 is, for example, a CPU or a microprocessor.

The network-address setting unit 22 shown in FIG. 2 is realized by the processor 201 and the memory 202. The real network address storage unit 23 and the virtual network address storage unit 24 are realized by the memory 202. The operation-state determination unit 21 and the address-conversion-table update instruction unit 26 are realized by the processor 201 shown in FIG. 18. The programs coded for the operations of the operation-state determination unit 21, the network-address setting unit 22, and the address-conversion-table update instruction unit 26 are stored in the memory 202. The processor 201 reads out and executes those programs to realize the operation-state determination unit 21, the network-address setting unit 22, and the address-conversion-table update instruction unit 26. The physical network interface 25 is realized by the network interface card 203. The hardware configuration of the network interface unit 2-1 is the same as that of the network interface unit 2-2.

The hardware configurations of the operator interface stations 4-1 and 4-2 are each the same as that of the network interface unit 2-1 shown in FIG. 18. Note, however, that FIG. 18 just shows a hardware configuration to realize operations described above. Generally, in addition to the components shown in FIG. 18, the operator interface stations 4-1 and 4-2 each include a display unit such as a display and an input unit such as a keyboard and a mouse.

The address-conversion-table management unit 43 and the upper-layer processing unit 44 shown in FIG. 2 are realized by the processor 201. The storage unit 42 is realized by the memory 202. The physical network interface 41 is realized by the network interface card 203. The programs coded for the operations of the address-conversion-table management unit 43 and the upper-layer processing unit 44 are stored in the memory 202. The processor 201 reads out and executes those programs to realize the address-conversion-table management unit 43 and the upper-layer processing unit 44.

In the present embodiment, an example has been explained in which the control device system is duplexed. Even when the control device system is multiplexed three or more fold, the same address setting method can be applied by pluralizing the non-active system. To be specific, any one of the multiple control devices is set for the active system, and control devices which are not set for the active system among the multiple control devices, are each set for the standby system. Also, in a case where the operator interface stations 4-1 and 4-2 are to manage multiple pairs of duplexed control device systems, an operation similar to the present embodiment can be adopted by using, for each pair of duplexed control device systems, virtual network addresses different from those used for other pairs.

In the present embodiment, explanation has been made assuming that the control device and the network interface unit are separate devices. However, an integration of the control device and the network interface unit may be regarded as a control device in a broader sense. This means that the control device includes the above-described network interface unit. That is to say, explanation has been made about an example assuming that the control device 1-1 and the network interface unit 2-1 are configured as separate devices; however, the control device 1-1 may also have the function of the network interface unit 2-1. Similarly, the control device 1-2 may have the function of the network interface unit 2-2.

As described above, in the network system of the present embodiment where the control device is multiplexed, the control device system is fully duplexed, to ensure robustness of the entire network system. In the present embodiment, it is not necessary to develop an application for managing the duplexed control devices. This requires no costs for useless development costs, i.e. human cost, temporal cost, and financial cost. Furthermore, an operator interface station which manages a non-duplexed control device can be used for managing duplexed control devices. Furthermore, even in a case where a computer system commercially available is used as an operator interface station, it suffices that just a few functions are added for the computer system to serve for duplexed control devices. This helps users build their network systems easily.

The configuration shown in the present embodiment is an example of the content of the present invention. It can be combined with another technique publicly available. It can also be changed or omitted in part, within the scope of the present invention.

The invention claimed is:

1. A network system, comprising:
   plurality of control devices;
   plurality of communication control devices connected to the respective plurality of control devices; and
   at least one monitoring device to monitor the plurality of control devices,
   wherein the at least one monitoring device is provided with a storage unit to store an address conversion table including network addresses of the plurality of communication control devices;
   wherein each of the communication control devices comprises:
   an address setting unit to set virtual identification information for its own identification information when the control device connected thereto is set for an active system, and to set its proper identification information when the control device connected thereto is set for a standby system for its own identification information; and
   an address update unit to request the at least one monitoring device to update the address conversion table on the basis of the identification information set by the address setting unit and wherein
   when requesting for updating the address conversion table, each of the communication control devices generates a communication frame indicating a request for updating the address conversion table and stores, in the communication frame, identification information being set to the each of the communication control devices, and the at least one monitoring device updates the address conversion table on the basis of the identification information stored in the communication frame.

2. The network system according to claim 1, wherein the virtual identification information includes a virtual physical network address and a virtual logical network address, and the proper identification information includes a proper physical network address and a proper logical network address.

3. The network system according to claim 1, wherein the communication control device connected to the control device being set for the standby system sets, when detecting an anomaly of the communication control device connected to the control device being set for the active system, the virtual identification information for the identification information of itself and requests the at least one monitoring device to update the address conversion table.

4. The network system according to claim 3, wherein the communication control device connected to the control device that had been set for the active system sets, when detecting after recovery from its failure that another communication control device has been set for the active system, proper identification information for the identification information of itself and requests the at least one monitoring device to update the address conversion table.

5. The network system according to claim 1, wherein the at least one monitoring device comprises plurality of monitoring devices.

6. A communication control device connected to one of plurality of control devices in a network system including the plurality of control devices and a monitoring device to monitor the plurality of control devices, the communication control device comprising:
   an address setting unit to set virtual identification information for its own identification information when the control device connected thereto is set for an active system, and to set its proper identification information for its own identification information when the control device connected thereto is set for a standby system; and
   an address update unit to request to update an address conversion table stored in the monitoring device on the basis of the identification information set by the address setting unit wherein, when requesting for updating the address conversion table, the communication control device generates a communication frame indicating a request for updating the address conversion table and stores, in the communication frame, identification information being set to the communication control device, and the monitoring device updates the address conversion table on the basis of the identification information stored in the communication frame.

7. The communication control device according to claim 6, wherein the virtual identification information includes a virtual physical network address and a virtual logical network address, and the proper identification information includes a proper physical network address and a proper logical network address.

8. An address setting method for a network system which includes plurality of control devices; plurality of communication control devices connected to the respective plurality of control devices; a monitoring device to monitor the plurality of control devices; and a monitoring device to monitor the plurality of control devices and include an address conversion table including network addresses of the plurality of communication control devices, the address setting method comprising:
 a first step in which the communication control device sets virtual identification information for its own identification information when the control device connected thereto is set for an active system;
 a second step in which the communication control device sets its proper identification information for its own identification information when the control device connected thereto is set for a standby system; and
 a third step in which the communication control device requests the monitoring device to update the address conversion table on the basis of the identification information set in the first step or the second step, wherein
when requesting for updating the address conversion table, each of the plurality of communication control devices generates a communication frame indicating a request for updating the address conversion table and stores, in the communication frame, identification information being set to the each of the plurality of communication control device, and the monitoring device updates the address conversion table on the basis of the identification information stored in the communication frame.

9. The address setting method according to claim 8, wherein the virtual identification information includes a virtual physical network address and a virtual logical network address, and the proper identification information includes a proper physical network address and a proper logical network address.

* * * * *